Patented Jan. 26, 1926.

1,571,054

UNITED STATES PATENT OFFICE.

MARTIN HOSENFELD, OF BERLIN-SIEMENSSTADT, GERMANY, ASSIGNOR TO SIEMENS & HALSKE, AKTIENGESELLSCHAFT, OF SIEMENSSTADT, NEAR BERLIN, GERMANY.

METHOD FOR REMOVING SILICA FROM ORE LEACHES.

No Drawing. Application filed January 26, 1925. Serial No. 4,944.

*To all whom it may concern:*

Be it known that I, MARTIN HOSENFELD, a citizen of the German Empire, residing at Berlin-Siemensstadt, Germany, have invented certain new and useful Improvements in Methods for Removing Silica from Ore Leaches, of which the following is a specification.

The present invention relates to a method for removing silica from its condition of solution or dispersion in ore solutions or leaches.

When silica-bearing ores are lixiviated with an acid, either before or after roasting, silicic acid or its anhydride, silica, is formed in the leach, generally in the colloidal condition. It may separate out as a gelatinous substance, making filtration of the leach very difficult or impossible. Or the gelatinous substance may extend throughout the leach and completely congeal it, which of course, makes filtration wholly impossible. In this latter state, the substance is a true jelly, while both the gelatinous substance and the jelly are generically designated as gels. In either case, it has not been conclusively shown whether the substance is silicic acid or merely a colloidal suspension of silica, and I have used the terms "jelly of silica" and "silica gel" to indicate the semi-solid silica-containing substances, whatever their true structure may be.

I have found that if a small quantity of a pulverulent substance be added to the leach, even after the gel has formed, the leach may be readily filtered to remove the gel. The pulverulent substance may consist of calcium sulfate, barium sulfate, or any similar substance which is insoluble in the lixiviating acid, or of powdered silica obtained by the method described below. While the powder is being added, the leach is stirred and heated. It is then filtered, and the gel obtained as a residue is dried, yielding silica.

By way of illustration, the process will now be more fully described as applied to the treatment of silica-bearing zinc ore, but it will be understood that it can also be applied to any other ore which contains silica in its composition.

The zinc is extracted in the known way by lixiviating with sulfuric acid either before or after roasting. The resulting leach is drained from the insoluble residue and allowed to stand until the gel appears. The powdered substance is then added, in the proportion of about five grams to each liter of leach, the mixture being meanwhile stirred and heated to a temperature of about 70° centigrade. The foregoing steps effect a change in the state of the gel, such that the leach may then be filtered, pressure being applied to hasten the process. The residue, consisting principally of the gel, is then removed from the filter press, washed with water to remove soluble impurities, dried in the presence of air, and pulverized. The resulting powder contains not merely silica but also the powdered sulfate added before filtration. A portion of this powder is then used in place of the sulfate in the next quantity of leach to be treated, the steps of heating and stirring being carried out as before. A portion of the powder obtained from this operation is added to the next quantity of leach, and so on.

It will be apparent that the powder obtained in each succeeding operation is poorer in sulfate, so that eventually the powder consists almost wholly of silica.

It is known that finely divided silica may be used as an ingredient of phosphate fertilizer. The silica obtained by the present method is especially suited for such use, since it is easily assimilated by plants. Furthermore, it will decompose the phosphate of the fertilizer so that this ingredient will also be easily assimilated. Ordinary silica does not show these properties except perhaps when very finely subdivided.

I claim:

1. A method of producing silica, which comprises adding a powdered sulfate to silica in colloidal condition, and removing the water.

2. A method of producing silica which comprises mixing a finely divided sulfate with a jelly of silica, and removing the water.

3. A method of producing silica which comprises mixing a powdered insoluble substance with a soft jelly of silica.

4. A method of producing silica which comprises mixing a powdered insoluble substance with a silica gel, removing the water, and pulverizing the resulting product.

5. A method of producing silica which comprises mixing a powdered insoluble substance with the jelly setting from an ore leach, removing the water, and pulverizing the resulting product.

6. A method of producing silica which comprises adding a powdered sulfate to an ore leach containing a silica gel, simultaneously stirring and heating the leach, removing the liquid from the gel, washing the gel, and subsequently drying and pulverizing it.

7. A method of removing silica from an ore leach containing a silica gel, which comprises adding a powdered substance to the leach, separating the fluid from the resulting residuum, drying and pulverizing the residuum, adding a portion thereof to another leach in place of said powdered substance, and repeating the foregoing steps in a continuous cycle.

8. A method of removing silica from an ore containing a silica gel, which comprises adding powdered barite to the leach, separating the liquid from the gel, drying and pulverizing the resulting product, adding a portion of the pulverized product to another leach in place of said barite, and repeating the foregoing steps in a continuous cycle of operation.

9. A method of producing silica which comprises adding a powdered substance to an ore leach containing a silica gel, stirring and heating the leach, removing the liquid from the resulting residuum, washing said residuum with water and subsequently drying and pulverizing it.

10. A method of producing silica which comprises adding a powdered sulfate to a soft silica gel, stirring and heating the resulting mixture, removing the liquid from the resulting residuum, and subsequently washing, drying and pulverizing said residuum.

11. A method of producing silica which comprises adding powdered barite to a silica gel, stirring and heating the resulting mixture, filtering the resulting product to remove liquid therefrom and pulverizing the filtration residue.

12. A method of producing silica which comprises mixing a powdered substance with a liquid containing silica gel, stirring and heating the resulting mixture, filtering the mixture, and pulverizing the filtration residue.

13. A method of producing silica which comprises mixing a powdered sulfate with a liquid containing a silica gel, stirring and heating said liquid, filtering the resulting product, and pulverizing the filtration residue.

14. A method of producing silica which comprises adding a powdered insoluble sulfate to an ore leach, simultaneously heating and stirring the leach, thereby effecting a separation of the liquid from the gel, drawing off the greater part of the liquid from the gel, filtering to remove the remainder of the liquid, washing the filtration residue, and drying and pulverizing said residue.

15. As an article of manufacture, silica obtained by mixing a powdered insoluble substance with a soft jelly of silica, and pulverizing the residuum.

16. As an article of manufacture, silica obtained by mixing a powdered insoluble substance with a soft gel of silica, and removing the water therefrom.

In testimony whereof I affix my signature.

MARTIN HOSENFELD.